United States Patent
Paredes et al.

[11] 3,893,093
[45] July 1, 1975

[54] CRANE BOOM ANGLE INDICATION AND WARNING SYSTEM

[75] Inventors: Candelario Paredes, Dallas; Robert Horn, Richardson, both of Tex.

[73] Assignee: Forney Engineering Company, Carrollton, Tex.

[22] Filed: July 25, 1973

[21] Appl. No.: 382,403

[52] U.S. Cl. .......................... 340/267 C; 212/39 A
[51] Int. Cl. ........................................ G08b 21/00
[58] Field of Search ................ 340/267 C; 212/39 A

[56] References Cited
UNITED STATES PATENTS

| | | | |
|---|---|---|---|
| 2,330,060 | 9/1943 | Kuehni | 340/267 C |
| 3,549,876 | 12/1970 | Hamilton | 340/267 C |
| 3,618,064 | 11/1971 | Hamilton | 212/39 A |
| 3,710,368 | 1/1973 | Hamilton | 212/39 A |

OTHER PUBLICATIONS
Halliday, David and Resnick, Robert, *Physics*, N.Y., John Wiley and Sons, Inc., 1966, page 801.

*Primary Examiner*—Glen R. Swann, III
*Attorney, Agent, or Firm*—Marvin A. Naigur; John E. Wilson; John P. De Luca

[57] ABSTRACT

There has been provided an improved Boom Angle Indication and Warning System for a crane, wherein a Boom Angle Transducer operatively coupled to the Boom produces an analogue output which when energized is proportional to the actual Boom Angle relative to a selected datum. The Boom Angle Transducer has an inertially governed pendulum driving a wiper for a calibrated potentiometer and variable selectable means establishes respective high and low analogue outputs proportional to Boom Angles corresponding to a Boom Angle range of operation. A meter indicator is selectively responsive to the actual Boom Angle Signal and also to the respective high and low angle outputs of the variable selectable means for providing visual indication of the transducer output and also the high and low outputs of the meter. Switching means selectively couples the transducer, and high and low angle outputs to the meter for providing said visual indication while a supply means coupled to the transducer variable means and the meter provide energization therefor. The improvement comprises a test circuit operatively coupled to the supply and the meter for switching out the transducer and coupling to the meter a slowly increasing input signal produced thereby said signal corresponding to a simulated transducer voltage output over the entire range of the boom operation to allow the operator to observe the operation of the meter including the low and high points.

15 Claims, 8 Drawing Figures

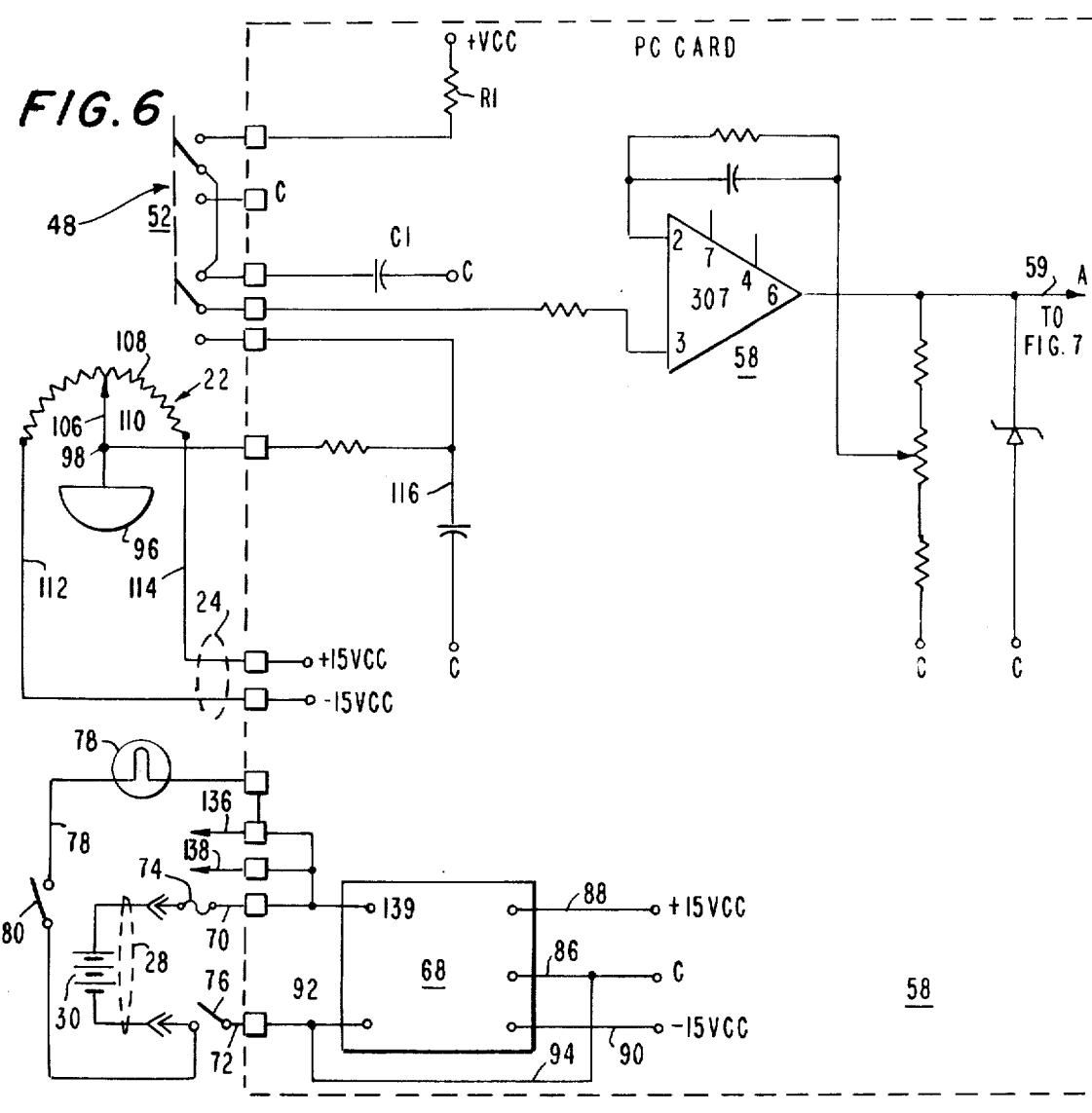
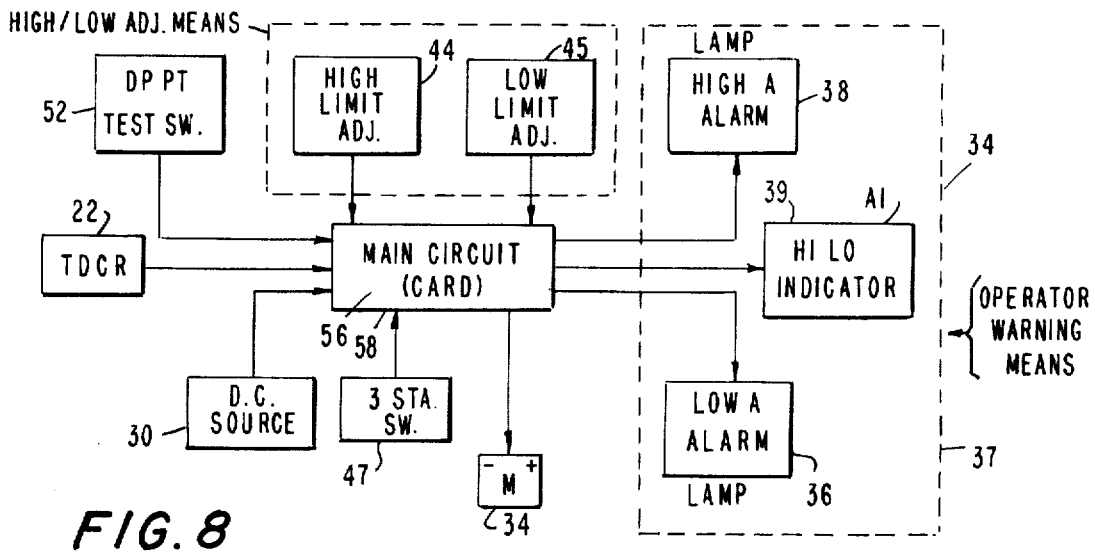

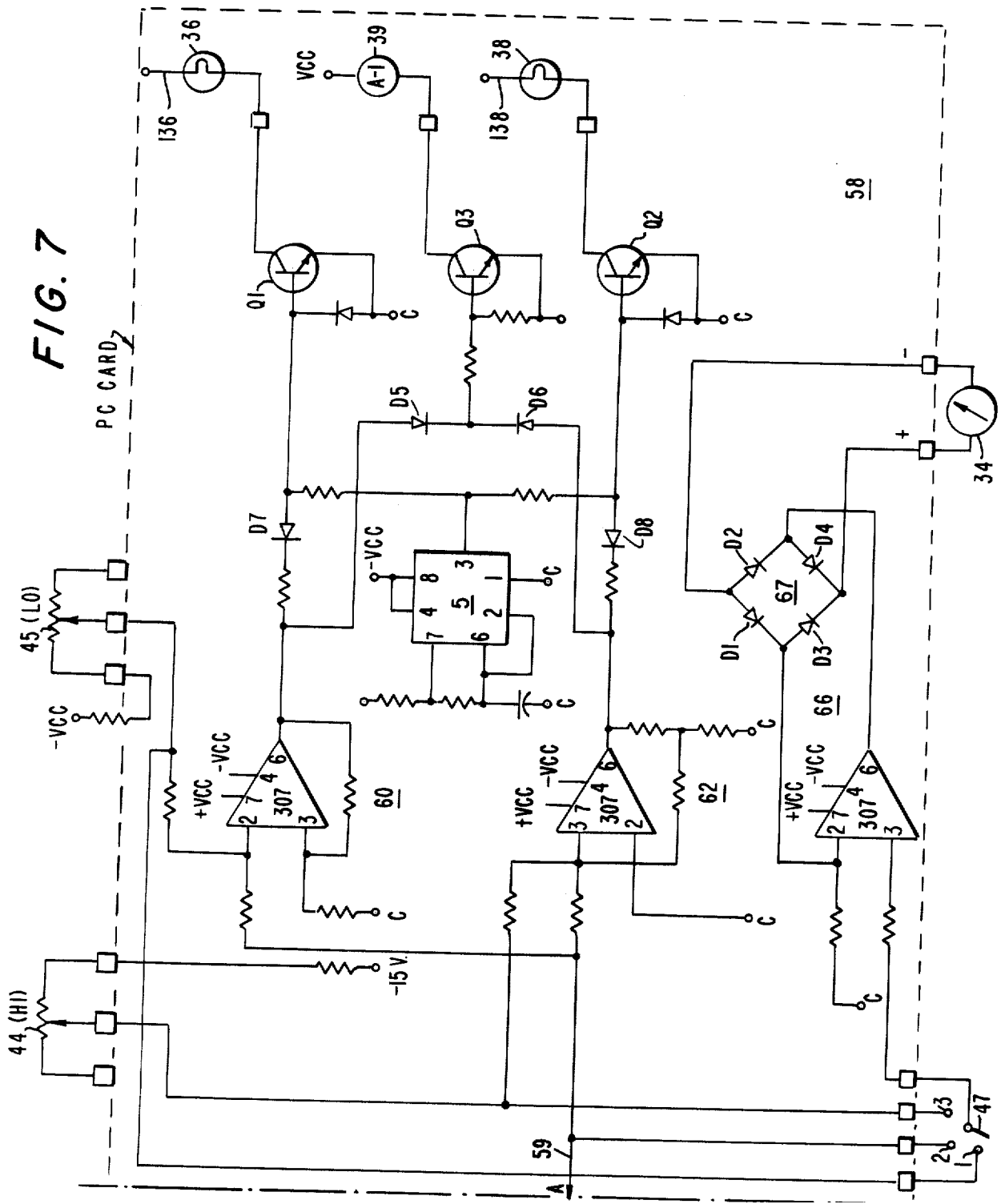

CRANE BOOM ANGLE INDICATION AND WARNING SYSTEM

BACKGROUND OF THE INVENTION

In connection with the use of boom-type cranes, the operator of the crane must continuously be informed of the relative boom angle with respect to the horizontal in order to keep the crane from tipping over. This is particularly important in the handling of relatively heavy loads in the range of small boom angles, i.e., when the boom is close to horizontal mode. Also, for efficiently and safely operating the crane, the boom angle indicator should be as accurate as possible throughout the angular range of the boom, which in most cases is about ninety degrees Prior attempts to provide a boom angle indicator which is entirely satisfactory, simple, efficient, effective, rugged and compact, have left much to be desired. Accordingly, the present invention overcomes serious problems associated with prior crane boom angle indicators, by providing a transistorized circuit system that lends itself to a sturdy type of construction and is accurate in operation. Simplicity is achieved by the provision of only two main units that comprise a boom angle transducer of novel construction, and a control box containing a novel printed circuit for handling the entire system, including a regulated voltage power supply circuit for energizing the entire system. The power supply circuit is energized by the battery in the crane to which the circuit is connected by an insulated cable.

In potentiometer/pendulum type boom angle transducers of the past, an analog signal that is truly accurate throughout an angular range of ninety degrees has presented a difficult problem. This problem is solved in accordance with the present invention by the provision of a transducer of unique construction, which generates a highly accurate positive voltage output that varies uniformaly in direct proportion to the actual boom angle in use, throughout the entire ninety degree range. This result is achieved by the arrangement of the potentiometer in the transducer and the energization by the printed circuit power supply.

Heretofore, it has been proposed to convert the analog signal from a boom angle transducer-potentiometer to the digital mode, then back to the analog mode for operating the boom angle indicating meter. Such complication is avoided by the present invention by virtue of a novel and very accurate, completely analog signal handling circuit. Thus, the circuitry of the present invention is strictly of the analog type throughout, which simplifies the system.

An important consideration in crane instrumentation is the punishing conditions under which operation takes place, such as extreme hot and cold temperatures, ambient air which is ladden with abrasive dust, and the severe vibration of the crane. Such conditions tend to shorten the useful life of the instrumentation, and also interfere with the accuracy of the equipment. The present system meets such conditions to a remarkable degree by providing a boom angle indicating system of long, trouble-free life, even when used in connection with a boom type crane.

Other requirements which are important for crane use are a system that can be quickly self-checked with respect to any possible failure in the primary electric power supply, and quick and easy testing of the entire system for operation of the angle indicating meter, as well as of the warning indicators, in order to assure the operator that the system is not defective.

As to the angle limit warning indicator system, this must be visual as well as audible, so that the operator will not fail to be warned, even while he is occupied in the operation of the crane. In the present case, a warning system is provided that is simple and foolproof, with the operator being warned by a flashing light, as well as by a buzzer or horn should either angle limit be reached by the boom. Further, such limits can be set quickly and with ease, by simply turning the selector switch to the appropriate station, and turning the corresponding potentiometer set adjustment knob, while observing the angle indicating meter. Thus, the limit warning indicators can be easily set to any desired high or low value.

Ease of servicing is also an important requirement, especially since this is usually done in the field location where the crane is being operated. This is achieved by the present invention by the use of a printed circuit card which can be quickly replaced in the event of a failure of any part of the circuit. Also, the printed circuit of the instant invention is capable of withstanding failure in use and is less subject to breakdown, due to vibration than prior devices.

The system of the present invention utilizes a boom angle transducer that is conveniently mounted on the boom of a crane, and a control-display module is located in the cab of the crane. The primary source of power for the system may be derived from the crane battery which is connected to the box by an insulated cable. The transducer and control-display module are electrically connected by a shielded cable. The control-display module contains a main printed circuit card having an integrated power supply circuit, providing a constant voltage source of $\pm 15$ vdc with a center terminal. The constant voltage supply circuit is connected across the end terminals of an arcuate potentiometer resistor in the boom angle transducer, such that angular movement of the resistor with the boom causes the resistor to slide over a pendulum oriented tap, the rotary axis of which corresponds to the movement of the resistor. The tap is centered with respect to the resistor when the boom is horizontal, and the resistor moves through an arc of ninety degrees when the boom moves through an arc which is equal thereto. The potentiometer, which is effectively centered between $-15$ vdc and $+15$ vdc, therefore changes from zero vdc to 7.94 vdc in direct proportion to the zero to ninety degree angular displacement. The control-display module comprises a front display panel which is provided with an analog meter for indicating the boom angle, a selector switch handle, and two angle limit set potentiometer adjusting knobs, along with angle limit warning lights and an audible alarm associated therewith. A test switch is located on one side wall of the control-display module, and also contains an audible alarm which is energized when either the high or low angle limit is reached. The control- display module is provided with a back panel light, as well as with an ON/OFF switch in the battery/voltage supply circuit.

The main circuit is printed on a card or board, contained within the control-display module, for handling almost the entire system which is supplied with regulated voltage- power only by the printed sub-circuit on the card. This card also contains, as part of the main circuitry, a testing circuit associated with corresponding warning indicator and a meter energizing circuit which is provided with a high impedance so as not to load the angle limit set potentiometers when the angle limits are displayed. In addition, the meter circuit acts to display either positive or negative voltage, since the limit set voltages are of opposite polarity to the actual angle signal voltage.

The test circuit includes a capacitor which is normally discharged through the test switch. However, when the test switch is operated, the input to the transducer signal amplifier is disconnected from the transducer, and connected to the capacitor. Also, a resistor is connected to the capacitor so as to cause the latter to be slowly charged by the +15vdc supply circuit, thereby providing a slowly increasing test voltage signal to the amplifier circuit. The signal simulates a slow change in the angular transducer position from zero to ninety degrees, thereby allowing the operator to observe the operation of the meter, as well as the operation of the high and low alarm points.

While the printed circuit board is reliable and rugged, nevertheless should a failure occur, the board can be easily replaced. The system is simple in construction, efficient in operation, and easy to install and/or replace. The construction of the transducer is also rugged, yet it generates a highly accurate analog signal that is directly proportional to the boom angle in operation. Also, the system may be easily eletrically connected to, or disconnected from the battery of the crane with which the system is associated. In addition, the system is entirely analog with respect to signal mode; thus avoiding conversion to the digital mode within the system.

SUMMARY OF THE INVENTION

There has been provided an improved Boom Angle Indication and Warning System for a crane, wherein a Boom Angle Transducer operatively coupled to the Boom produces an analogue output which when energized is proportional to the actual Boom Angle relative to a selected datum. The Boom Angle Transducer has an inertially governed pendulum driving a wiper for a calibrated potentiometer and variable selectable means establishes respective high and low analogue outputs proportional to Boom Angles corresponding to a Boom Angle range of operation. A meter indicator is selectively responsive to the actual Boom Angle Signal and also to the respective high and low angle outputs of the variable selectable means for providing visual indication of the transducer output and also the high and low outputs of the meter. Switching means selectively couples the transducer, and high and low angle outputs to the meter for providing said visual indication while a supply means coupled to the transducer variable means and the meter provide energization therefor. The improvement comprises a test circuit operatively coupled to the supply and the meter for switching out the transducer and coupling to the meter a slowly increasing input signal produced thereby said signal corresponding to a simulated transducer voltage output over the entire range of the boom operation to allow the operator to observe the operation of the meter including the low and high points.

BRIEF DESCRIPTION OF THE DRAWINGS

The above brief description, as well as further objects, features, and advantages of the present invention will be more fully appreciated by reference to the following detailed description of a presently preferred but nonetheless illustrative embodiment in accordance with the present invention, when taken in connection with the accompanying drawings wherein:

FIG. 6 is a circuit diagram of a portion of the electrical circuit of the system;

FIG. 7 is a circuit diagram of another portion of the electrical circuit of the system; and FIG. 8 is a block diagram of the system.

DESCRIPTION OF THE PREFERRED EMBODIMENT

Figure 1:
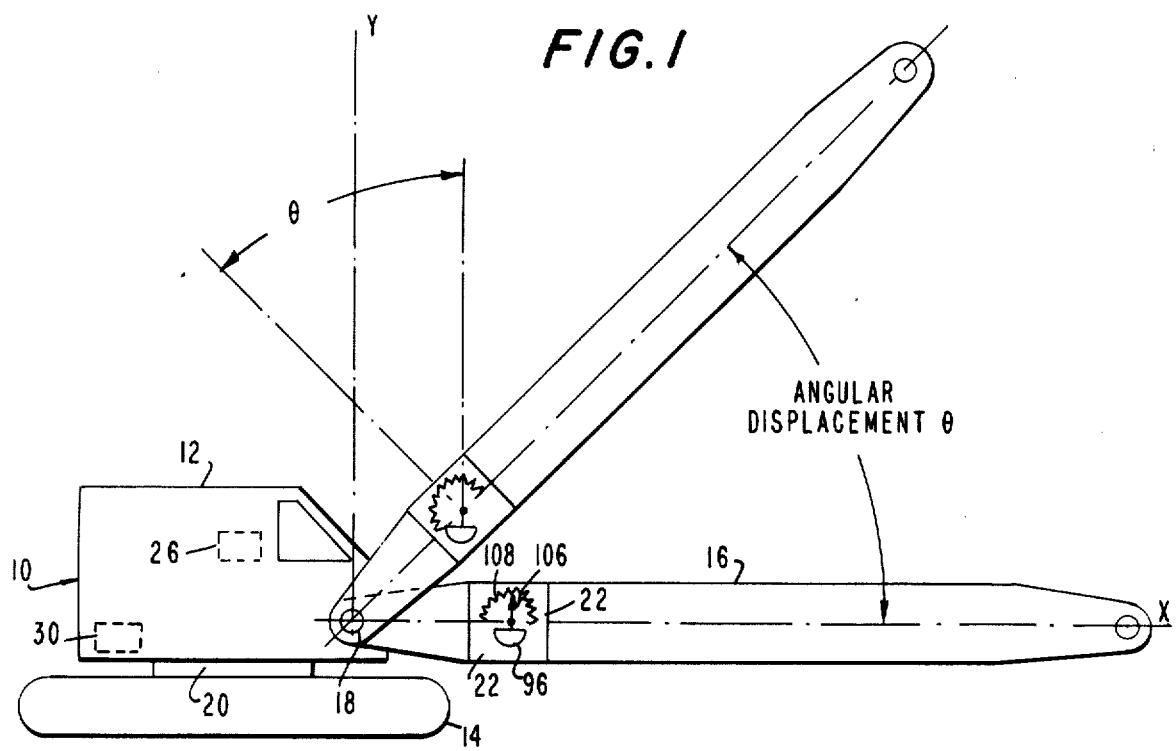
FIG. 1 is an elevational view of a crane in which the boom angle transducer of the present invention is employed.
Figure 3:
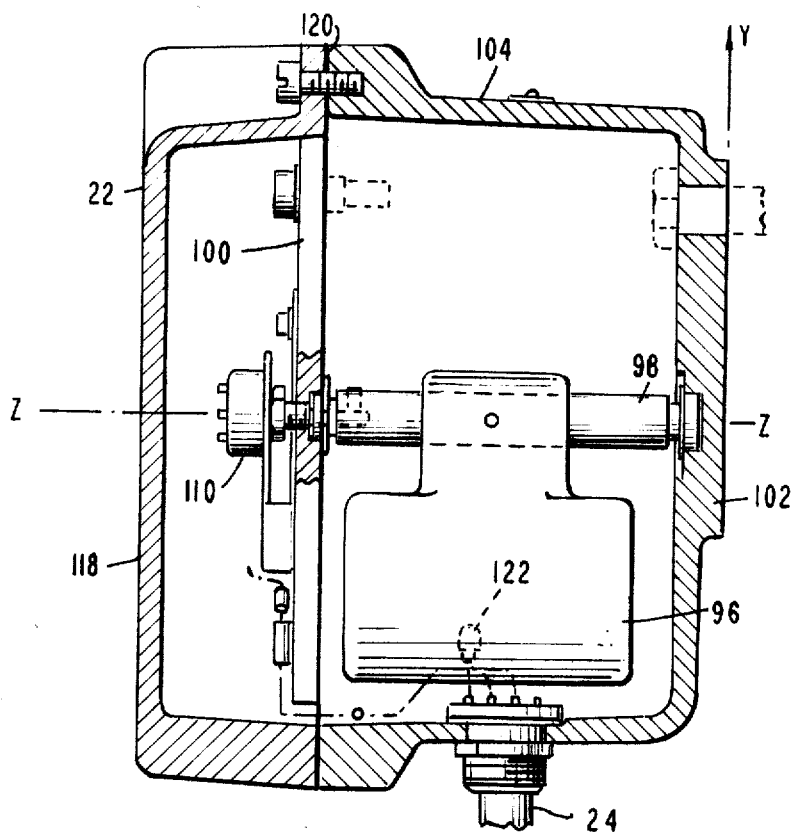
FIG. 3 is a sectional view of the transducer taken along line 3—3 of FIG. 2.

Referring to FIG. 1, a crane is shown which is generally designated by the reference numeral 10. The crane 10 includes a cab 12, and a boom 16, which is pivoted at 18 in front of the cab 12 for vertical movement through an angle of about ninety degrees. The boom 16 and cab 12 turn about a vertical axis located at the center of a horizontal ring 20 under the cab 12, as will be well understood by those skilled in the crane art. Mounted on the boom 16 at a convenient location is a Boom Angle Transducer (BAT) 22 for generating an output signal that is proportional to the angle subtended between the boom 16 and the horizontal axis of the crane 10. As shown in FIG. 3, the boom angle transducer 22 is electrically connected via a shielded cable 24, to a control-display module 26, which is located in the cab 12. An insulated cable 28 electrically connects the box 26 to a 24-volt battery 30, shown in FIG. 6.

Figure 4:
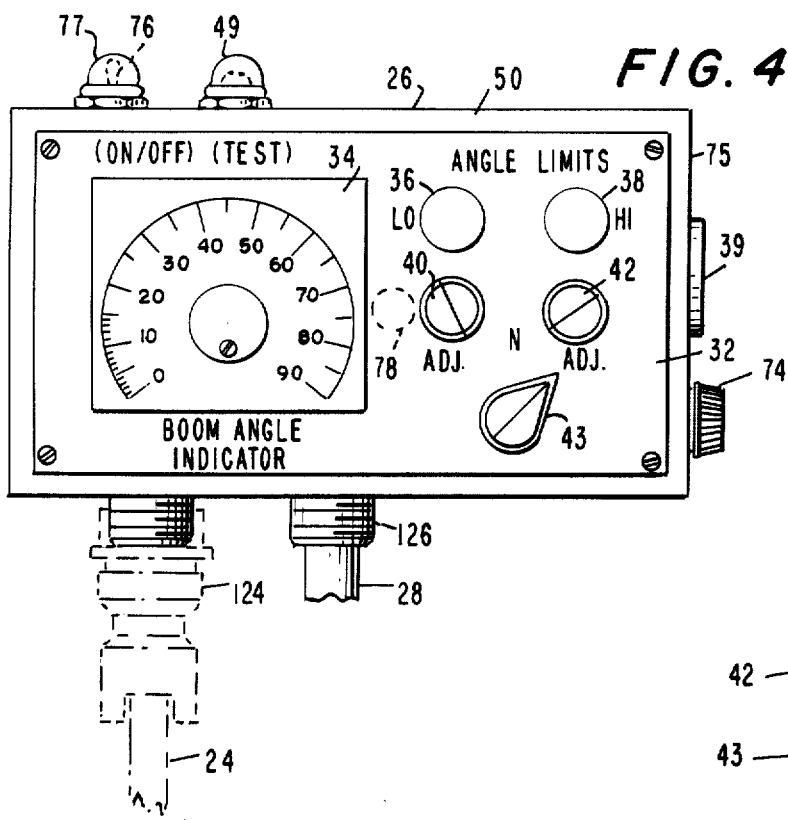
FIG. 4 is a front elevational view of the control- display module.

Referring to FIG. 4, the control-display module 26 is provided with a front panel 32, containing a boom angle indicating meter 34 with low (LO) and high (HI) angle limit lamps 36 and 38. The lamps 36, 38 are located directly above corresponding adjustment knobs (ADJ) 40 and 42 for manually adjusting potentiometers 44 and 45, respectively, (FIG. 7), that are located within the box 26, (FIG. 4). A manually operated test switch push-button 48 is located on top wall 50 for operating a DPDT test switch 52, (FIG. 6), of a system test circuit constituting a part of the main circuit 56 (FIG. 8), that is printed on a board or card 58 which is contained within the control-display module 26, (FIG. 4). The printed circuit 56 contains, in addition to the system test switch 52, (FIG. 6), a signal amplifying integrated circuit 58, voltage comparator integrated circuits 60 and 62, (FIG. 7), a meter circuit 66, and a regulated voltage-power supply integrated circuit 68, (FIG. 6).

The power supply circuit 68 is connected to the battery 30 by conductors 70, 72 in the cable 28. The conductor 70 contains a fuse 74, and the conductor 72 contains an ON/OFF switch 76. A lamp 78 for back-illuminating the panel 34 of control-display module 26, (FIG. 4), is connected in a circuit 79 containing a switch 80 which is across the battery output circuits 70, 72. Conductors 136 and 138 connect the positive circuit 70 of the battery 30 to the positive terminals of lamps 36, 38, (FIGS. 4 and 7). The integrated power supply circuit 68, (FIG. 6), provides +15vdc between a center (C) output terminal 86 and a +vcc output terminal 88, as well as −15vcc between such central terminal 86 and a −vcc output terminal 90. The center terminal 86 is connected to the negative input terminal 92 of the circuit 68 by a ground conductor 94.

DETAILED DESCRIPTION OF BOOM ANGLE TRANSDUCER

Figure 2:
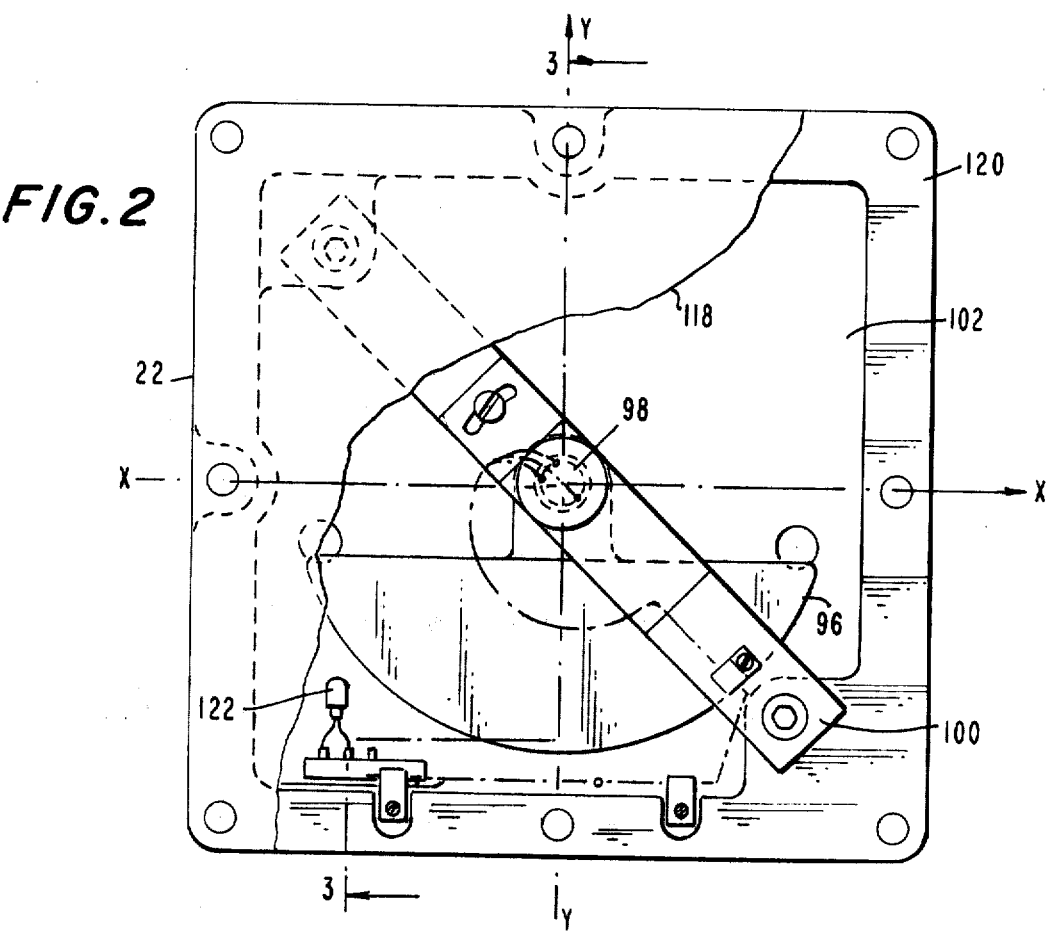
FIG. 2 is an enlarged front elevational view of the transducer, with portions broken away to show the interior.

Referring to FIGS. 2, 3 and 6, the boom angle transducer 22 comprises a pendulum 96 fixed to a horizontal shaft 98 that is supported by suitable bearings in the center of a diagonal bar 100 at one end, and the rear wall 102 of a casing 104 at the other end. The shaft 98 is fixed to a radial tap 106 of an arcuate resistor 108, the elements of which constitute the potentiometer 110 of the transducer 22. The ends of the resistor 108, (FIG. 6), are connected by leads 112, 114 in cable 24 to −vcc and +vcc terminals 90 and 88, respectively; while the tap 106 is connected to the center (C) terminal of the power supply 68 by a ground circuit 116. The casing 104, (FIG. 3), is provided with a front cover 118 that is tightly bolted to the rim of the casing 104 with a sealing gasket 120 therebetween, and the casing 104 contains a small calibration lamp 122.

The boom angle transducer 22 is used in the present system to develop an accurate analog DC voltage proportional to angular displacement. As can be seen in FIG. 1, the transducer 22 is mounted directly to the boom member 16 which will undergo angular displacement. For ease of calibration, it is desirable to mount the transducer 22 so that its X and Y axes are parallel to the corresponding X and Y axes of the member 16. As the boom member 16 travels from a fully horizontal position to a fully vertical position, the pendulum 96 tends, by virtue of gravity, to remain in a position with its Y axis perpendicular to the ground. As the boom member 16 pivots through ninety degrees of rotation, the potentiometer 110 also rotates through an angle of 90° about its own Z axis. The shaft 98 of potentiometer 110 is in fixed communication with the pendulum 96. Therefore, as the potentiometer 110 is rotated about its own Z axis with its shaft 98 (FIG. 3) held in a non-turning position by the pendulum 96, the output of the potentiometer 110 is increased proportionally with increasing angular displacement. As was previously stated, both ends of the potentiometer 110 in the transducer 22 are connected to the temperature stable power supply circuit 68 (FIG. 6), one end of the potentiometer 110 being connected to the +15vdc terminal 88, and the other to the −15vdc terminal 90.

The potentiometer 110 is capable of being displaced angularly to 340°. Accordingly, the output of the potentiometer 110, as measured between the coommon C terminal 86 of the power supply circuit 68 and the center tap (wiper) 106 of the potentiomer 110 can vary from −15vdc to +15vdc. In the present system, the transducer 22 is installed on the boom member 16 so as to produce a zero vdc output signal when the boom member 16 is horizontal with the wiper 106 centered between −15vdc and +15vdc. As the boom member 16 is displaced angularly to 015 90°, the wiper 106 is also effectively displaced 90° in the direction of +15vdc side of the resistor 108. The output signal therefore undergoes a change of 90/170 (+15vdc), or 7.94vdc directly proportional to 0 to 90° angular displacement.

DETAILED DESCRIPTION OF THE CONTROL-DISPLAY MODULE

Figure 5:
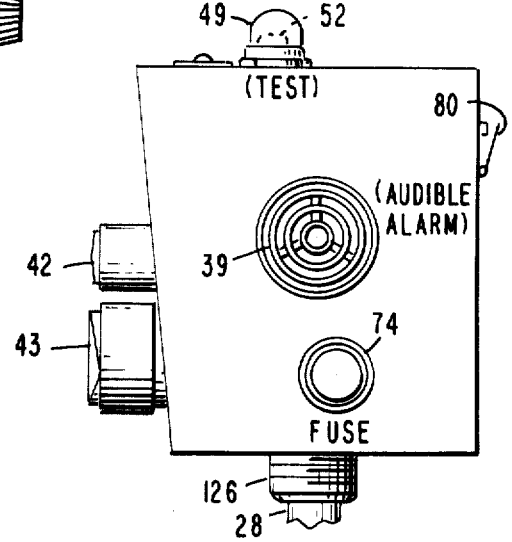
FIG. 5 is a side elevational view of the control- display module shown in FIG. 4.

As pointed out above, the control-display module 26 is equipped with: (a) an analog meter 34 for display of the boom angle; (b) a selector switch handle 43, used for manual adjustment of the desired high and low angle limits (as well as an N position for normal operation); (c) two potentiometers 44, 45, (FIG. 7) having knobs 40, 42 for setting low and high angle limits; (d) low and high angle warning lights 36, 38; (e) an audible buzzer alarm 39 which is energized by either low or high angle limit; (f) a manually operated ON/OFF switch 76 (FIG. 6); (g) a panel back light 78, and switch 80 (FIG. 5); and (h) a test switch 52 for self-checking the circuitry. In addition to the above, there are also provided two separate connectors 124, 126 for connecting the display module 26 to the boom angle transducer 22, and the vehicle power supply 30. A single printed circuit (P.C.) card 58 containing transistorized electronic circuitry 56 for the system is also contained within module 26.

The transistorized main circuit 56 which is shown in detail in FIGS. 6 and 7 operates as follows:

The signal from the transducer 22 is passed through the test switch 52 to the amplifier circuit 58 where it is amplified so that the ninety degree displacement is equal to a 10 volt level. Amplifier circuit 58 is a voltage follower with gain. The voltage follower is used to prevent loading of the potentiometer 110. The amplified signal from circuit 58 is applied through lead 59 (FIG. 7) to the low limit comparator circuit 60, high limit comparator circuit 62 and meter circuit 66 through position 2 of the meter selector switch 47. The inputs to the low limit comparator circuit 60 are the actual angle signals and an opposite polarity voltage from the low limit set potentiometer 45 that is porportional to the desired low limit angle. The inputs to the high limit comparator circuit 62 are the actual angle signal and the opposite polarity voltage from the high limit set potentiometer 45 that is proportional to the desired high limit angle.

As long as the actual angle signal is greater than the low limit voltage and lower than the high limit voltage, the outputs of both comparator circuits 60, 62 are negative, and this keeps transistors Q1, Q2 and Q3 turned off. If the actual angle goes below the low limit, or above the high limit, the output of the appropriate comparator circuit becomes high. This willl supply base current to transistor Q3 through diode D5 or D6, and causes transistor Q3 to turn on, sounding the audible alarm (A1) 39. The high output of the comparator will also reverse bias either diode D7 or D8, thereby allowing a flasher circuit 5 to supply base current to transistor Q1 or Q2. Since the output of flasher circuit 5 is a pulsating current, transistor Q1 or Q2 is alternately turned on and off, thereby causing the alarm lamp 36 or 38 to flash. The supply circuits of lamps 36 and 38 (FIG. 7) include positive leads 136, 138, respectively, which are connected to the positive circuit 70 (FIG. 6) that connects the positive side of battery 30 to the positive input terminal 139 of the DC supply circuit 68.

The low limit and high limit set potentiometers 44, 45 are adjusted while displaying their outputs on the angle meter 34 through positions 1 and 3 of the meter selector switch 47. Position 2 is the normal (N) position or station of switch 47.

Meter circuit 66 serves two functions, as it has a very high input impedance. Thus, circuit 66 does not load the limit set potentiometers 44, 45 when the limits are being displayed. In addition, circuit 66 acts to display either positive or negative voltages, which is necessary since the limit set voltages are of opposite polarity to the actual angle signal. This is accomplished by a full-wave type rectifier circuit 67 composed of four diodes D1, D2, D3, and D4, arranged so that current flows to the terminals of meter 34 from plus to minus when switch 47 is in normal station 2, as well as in either station 1 or 3.

During normal operation, capacitor C1 (FIG. 6) is held discharged through the test switch 52. When the test switch is manually closed, the input to amplifier 58 is disconnected from the transducer 22 and connected to capacitor C1. At the same time, resistor R1 is connected to capacitor C1, and the resistor R1 then slowly charges the capacitor C1, which thus provides a slowly increasing input signal to amplifier 58. This signal simulates a slow change in the angular position from zero to ninety degrees in transducer 22, thereby allowing the operator to observe the operation of the angle meter 34, as well as the operation of the low and high alarm points.

The switches 52 and 76 which project above the top wall 50 of module 26 are protected by rubber nipples 49 and 77, respectively. The selector switch handle 43 can be used to manually shift the switch 47 to either adjusting station 1 or 3 from its normal (N) station 2. The fuse 74 is located in the right side wall 75 of module 26, as is the audible alarm A1 (buzzer) 39. The module 26 is compact, yet highly visible to the operator, and the appropriate light 36 or 38 flashes and the buzzer 39 sounds when the corresponding high or low angle limit for which the system has been set is reached by the boom member 16. The operator is thus alerted to a possible dangerous operating condition and controls the boom angle to avoid such danger.

SUMMARY OF OPERATION OF THE SYSTEM

With reference to the block diagram of FIG. 8, to adjust the system for high and low boom angle limits, the selector switch 47 is first turned to station 1 and by observing the meter 34, the high limit potentiometer 44 is adjusted until the meter 34 reads the desired value. The low value is similarly obtained. The switch 47 then is set to N, and the crane 10 is operated in the usual manner until either limit is reached, whereupon audible alarm A1 (buzzer) 39 sounds, and the corresponding alarm 36 or 38 flashes, indicating to the operator a possible danger in the inclination of the boom member 16.

In normal operation of the system, with the crane battery 30 connected to the main circuit 56, the transducer 22 transmits an analog signal to the circuit 56 and the meter 34 indicates the actual boom angle, which changes continuously as the crane 10 is operated. So long as the angle limits remain within the set high and low values, the alarms remain quiet. To self-check the system, the DPDT test switch 52 is manually operated, and the system automatically energizes the meter 34 to indicate slowly until the desired simulated limits are reached, whereupon the warning system 37 goes into operation, simulating the desired working conditions.

A latitude of modification, change and substitution is intended in the foregoing disclosure and in some instances some features of the invention will be employed without a corresponding use of other features. Accordingly, it is appropriate that the appended claims be coonstrued broadly and in a manner consistent with the spirit and scope of the invention herein.

What is claimed is:

1. An improved boom angle indicating and warning system for a crane, including: a boom angle transducer for producing an analogue output proportional to the boom angle position, a boom angle meter responsive for providing a visual indication of boom position over a range of 90° from a full vertical to horizontal, warning means for selected high and low boom angle limits for indicating respective upper and lower limits of boom position defining a range of permissable operation; main circuit means coupled to the transducer and warning means for energizing same and variable means coupled to the warning means manually selectable for setting said upper and lower angle limits, wherein the improvement comprises:

test circuit means switchably coupled with said main circuit means and said transducer for generating a slowly increasing signal corresponding to a simulated transducer output in place of the actual output thereof for driving the meter through the entire operating range including the high and low boom angle limits for allowing an operator of the crane to observe the operation of the meter.

2. The invention as defined by claim 1 in which said main circuit means further comprises: a manually operated double-pole double-throw test switch connected to said main circuit means for alternately switching outputs of said transducer and the test circuit into said main circuit means.

3. The invention as defined by claim 1, in which said transducer generates an output signal that is a positive voltage which is directly proportional to the boom angle between zero and ninety degrees, said variable means for manually setting the operating limits comprises a manually adjustable potentiometer for establishing each of said upper and lower limits each supplying an inverted voltage relative to the transducer output respectively corresponding to said upper and lower limits, said meter being responsive to positive as well as negative voltage inputs thereto.

4. The invention as defined by claim 3, in which a selector switch having at least three stations corresponding to normal, high and low positions is respectively connected to said circuit means for operating said meter to show the boom angle when in a normal station, and for indicating the selected angle limit sets of said potentiometers when switched to corresponding high and low limit stations thereof.

5. The invention as defined by claim 4, in which said main circuit means includes meter circuit impedance means having a high input impedance relative to that of each of the limit set potentiometers so as to reduce loading when the limits thereof are displayed by the meter, and said meter circuit being operative to couple both positive and negative voltages to said meter as may be required.

6. The invention as defined by claim 1, in which said warning means comprises: a lamp for indicating when each of said upper and lower limits of operation is reached respectively, and an audible indicator operative when either of said upper and lower limits of operation is reached.

7. The invention as defined in claim 6 wherein said warning includes a flasher for driving said lamps when either of said limits are reached.

8. The invention as defined by claim 6, in which said main circuit means comprises a single circuit board 9. The invention as defined by claim 8 in which said main circuit means comprises: integrated high and low limit comparator integrated circuits, one voltage input of which corresponds to the positive actual angle voltage output of the transducer and another input respectively corresponding to a negative voltage from the corresponding potentiometer, whereby when the actual angle is between the low and high limits, the output of the corresponding comparator is negative and the warning indicators remain in an OFF condition, and when the actual angle exceeds either the high or the low limit, the corresponding comparator output becomes positive, operating the audible warning indicator as well as the corresponding warning lamp.

10. The invention as defined by claim 9 in which the main circuit means further comprises: an integrated constant DC power supply circuit having a central ground output terminal, and a +15 volt output terminal and a −15 volt output terminal, a battery, an ON/OFF switch connecting the negative input terminal of said DC power supply circuit to the negative terminal of the battery, and an indication lamp connected on an input terminal of the DC power supply circuit and to a terminal of said battery for indicating when the former is in and ON condition.

11. The invention as defined by claim 10 in which the meter circuit comprises:
an integrated amplifier having an output terminal, a ground terminal connected to the central terminal of said DC power supply circuit, and an input terminal connected to a selector terminal of said selector switch, said impedance means comprising a full wave rectifier bridge having input terminals coupled across the output terminal of the amplifier and said ground terminal, and output terminals of said bridge coupled to the meter.

12. An angle indicating system as defined in claim 11 further comprising a main circuit board means, and a control display module containing said main circuit board, said module having a front panel containing the boom angle meter, high and low limit warning indicating lamps, an adjusting knob, for each of said high and low limit potentiometers, and a three-station handle, for said selector switch, said main circuit board means, having respective terminals for connection to, the output terminals of the battery, the boom angle transducer output, the high and low limit set potentiometers located in said module, the boom angle meter, selector switch, and indicating lamps.

13. The invention as defined by claim 12 in which said main circuit board means contains an integrated constant DC power supply circuit for energizing the entire system, said power supply circuit including a center ground terminal and positive and negative terminals for supplying equal 15 volt signals to the system, with respect to said center terminal.

14. The invention as defined by claim 13 in which said main printed circuit board comprises: means for connecting the transducer to said plus and minus DC power supply circuit terminals, and the transducer including a pendulum-balanced slide, and an arcuate resistance element rotatable with said boom member and in contact with said slide said resistance element being connected across said DC power supply circuit, said arcuate resistance element of the transducer being capable of being displaced angularly through about 340°, the output of the potentiometer varying between −15vdc and +15vdc, the slide when held at the center of the arcuate resistance element establishing a zero output for the transducer.

15. The invention defined in claim 14 wherein: the output of the transducer varies from zero output at a horizontal boom position to a positive 15 vdc in the vertical.

* * * * *